(12) United States Patent
Hertel et al.

(10) Patent No.: US 8,774,721 B2
(45) Date of Patent: Jul. 8, 2014

(54) DETECTING A COMMUNICATION TAP VIA SIGNAL MONITORING

(75) Inventors: Philipp Hertel, San Francisco, CA (US); Alexander W. Hertel, Sunnyvale, CA (US); Sheldon I. Walfish, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/443,683

(22) Filed: Apr. 10, 2012

(65) Prior Publication Data

US 2013/0267176 A1 Oct. 10, 2013

(51) Int. Cl.
*H04B 7/00* (2006.01)

(52) U.S. Cl.
USPC ..................... 455/41.3; 455/67.11

(58) Field of Classification Search
USPC ............... 455/406, 407, 408, 410, 411, 41.2, 455/41.3, 67.11, 69
See application file for complete search history.

(56) References Cited

U.S. PATENT DOCUMENTS

| | | | |
|---|---|---|---|
| 6,005,942 A | 12/1999 | Chan et al. | |
| 6,141,752 A | 10/2000 | Dancs et al. | |
| 6,484,174 B1 | 11/2002 | Wall et al. | |
| 6,647,260 B2 | 11/2003 | Dusse et al. | |
| 7,072,854 B2 | 7/2006 | Loeser | |
| 7,110,792 B2 | 9/2006 | Rosenberg | |
| 7,128,274 B2 | 10/2006 | Kelley et al. | |
| 7,140,549 B2 | 11/2006 | de Jong | |
| 7,152,782 B2 | 12/2006 | Shenker et al. | |
| 7,232,073 B1 | 6/2007 | de Jong | |
| 7,243,853 B1 | 7/2007 | Levy et al. | |
| 7,255,264 B2 | 8/2007 | De Leon | |
| 7,275,685 B2 | 10/2007 | Gray et al. | |
| 7,374,099 B2 | 5/2008 | de Jong | |
| 7,469,151 B2 | 12/2008 | Khan et al. | |
| 7,494,055 B2 | 2/2009 | Fernandes et al. | |
| 7,631,346 B2 | 12/2009 | Hinton et al. | |

(Continued)

FOREIGN PATENT DOCUMENTS

| KR | 10 2009 0121497 | 11/2009 |
|---|---|---|
| WO | WO 01/22374 | 3/2001 |

(Continued)

OTHER PUBLICATIONS

Hancke et al., "Confidence in smart token proximity: Relay attacks revisited," ISG Smart Card Centre, Royal Holloway, University of London, Egham TW20 0EX, UK, Oct. 2009.

(Continued)

*Primary Examiner* — Ping Hsieh
(74) *Attorney, Agent, or Firm* — Johnson, Marcou & Isaacs, LLC (57) ABSTRACT

Using a Bluetooth communication channel for point of sale processing simulates a near field communication connection. A contactless device and the point of sale reader establish an unsecure communication channel. The user taps the contactless device with a point of sale terminal reader. The contactless device creates receive signal strength indicator ("RSSI") value spikes. The terminal reader measures the RSSI values and transmits them to the contactless device, which determines if the RSSI value reaches or exceeds a threshold configured for the contactless device. If the threshold is reached, the terminal reader and the contactless device establish a secure communication connection. The devices communicate via the secure communication connection, and the connection is terminated when a request to terminate is received.

25 Claims, 4 Drawing Sheets

(56) References Cited

U.S. PATENT DOCUMENTS

| | | | |
|---|---|---|---|
| 7,631,810 B2 | 12/2009 | Liu et al. | |
| 7,748,618 B2 | 7/2010 | Vawter | |
| 7,784,684 B2 | 8/2010 | Labrou et al. | |
| 7,896,233 B2 | 3/2011 | Phillips | |
| 7,949,309 B2 | 5/2011 | Rofougaran et al. | |
| 7,996,320 B2 | 8/2011 | Bishop et al. | |
| 8,005,426 B2 | 8/2011 | Huomo et al. | |
| 8,016,192 B2 | 9/2011 | Messerges et al. | |
| 8,041,338 B2 | 10/2011 | Chen et al. | |
| 8,131,596 B2 | 3/2012 | McQuilken | |
| 8,240,560 B2 | 8/2012 | Adams et al. | |
| 8,358,596 B2 | 1/2013 | Byrne et al. | |
| 2001/0018666 A1 | 8/2001 | Sugiyama et al. | |
| 2002/0068554 A1 | 6/2002 | Dusse | |
| 2002/0194138 A1 | 12/2002 | Dominguez et al. | |
| 2005/0071418 A1 | 3/2005 | Kjellberg et al. | |
| 2005/0222961 A1 | 10/2005 | Staib et al. | |
| 2006/0018450 A1 | 1/2006 | Sandberg-Diment | |
| 2006/0165060 A1 | 7/2006 | Dua | |
| 2007/0099679 A1 | 5/2007 | Saarisalo | |
| 2007/0135164 A1 | 6/2007 | Lee | |
| 2007/0156436 A1 | 7/2007 | Fisher et al. | |
| 2008/0011837 A1 | 1/2008 | Wesley | |
| 2008/0051059 A1 | 2/2008 | Fisher | |
| 2008/0085698 A1 | 4/2008 | Gamm | |
| 2008/0230615 A1 | 9/2008 | Read et al. | |
| 2008/0287060 A1 | 11/2008 | Ramsten et al. | |
| 2009/0006263 A1 | 1/2009 | Power et al. | |
| 2009/0068982 A1 | 3/2009 | Chen et al. | |
| 2009/0094125 A1 | 4/2009 | Killian et al. | |
| 2009/0144161 A1 | 6/2009 | Fisher | |
| 2009/0192935 A1 | 7/2009 | Griffin et al. | |
| 2009/0240626 A1 | 9/2009 | Hasson et al. | |
| 2010/0023449 A1 | 1/2010 | Skowronek et al. | |
| 2010/0049654 A1 | 2/2010 | Pilo | |
| 2010/0088188 A1 | 4/2010 | Kumar et al. | |
| 2010/0161403 A1 | 6/2010 | Fisher et al. | |
| 2010/0174598 A1 | 7/2010 | Khan et al. | |
| 2010/0211504 A1 | 8/2010 | Aabye et al. | |
| 2010/0257033 A1 | 10/2010 | Roberts et al. | |
| 2011/0076941 A1 | 3/2011 | Taveau et al. | |
| 2011/0093326 A1 | 4/2011 | Bous et al. | |
| 2011/0112968 A1 | 5/2011 | Florek et al. | |
| 2011/0171907 A1* | 7/2011 | Jolivet | 455/41.1 |
| 2011/0173073 A1 | 7/2011 | Wang et al. | |
| 2011/0187652 A1 | 8/2011 | Huibers | |
| 2011/0191438 A1 | 8/2011 | Huibers et al. | |
| 2011/0191823 A1 | 8/2011 | Huibers | |
| 2011/0202415 A1 | 8/2011 | Casares et al. | |
| 2011/0275421 A1 | 11/2011 | Wong et al. | |
| 2011/0292973 A1 | 12/2011 | Kianush et al. | |
| 2011/0320293 A1 | 12/2011 | Khan | |
| 2012/0015605 A1* | 1/2012 | Sole | 455/41.3 |
| 2012/0023026 A1 | 1/2012 | Chen et al. | |
| 2012/0078751 A1 | 3/2012 | MacPhail et al. | |
| 2012/0108173 A1* | 5/2012 | Hahm et al. | 455/41.2 |
| 2012/0329407 A1 | 12/2012 | Rousu et al. | |
| 2013/0060959 A1 | 3/2013 | Taveau et al. | |
| 2013/0090064 A1 | 4/2013 | Herron et al. | |
| 2013/0093388 A1 | 4/2013 | Partovi | |
| 2013/0109433 A1 | 5/2013 | Wang et al. | |

FOREIGN PATENT DOCUMENTS

| | | |
|---|---|---|
| WO | WO 0152212 A1 | 7/2001 |
| WO | WO 2004/054125 | 6/2004 |
| WO | 2009/018255 A2 | 2/2009 |
| WO | WO 2010144370 A2 | 12/2010 |
| WO | 2011/127627 A1 | 10/2011 |

OTHER PUBLICATIONS

Hopping, "Technology in Retail," IBM Corporation, Technology in Society, No. 22, pp. 63-74, 2000.
"ISO/IEC 21481:2005 Information technology—Telecommunications and information exchange between systems—Near Field Communication interface and protocol-2 (NFCIP-2)," International Standard ISO/IEC, vol. 21481, Jan. 1, 2005, pp. 1-5, XP009121925.
Smart Cards; UICC-CLF interface; Host Controller Interface P2P, LNC Protocol (Document inputted in NFC Forum for information), SCPT080001, European Telecommunications Standards Institute (ETSI), No. vol. 1.0, Jan. 11, 2008, pp. 1-33, XP014051745.
Langer et al., "NFC-Technologies", In: "Anwendungen and Technik von Near Field Communication (NFC)", 1 Jan. 1, 2010, XP55020102, pp. 87-108.
"PN533 User Manual Rev. 03", Jan. 14, 2009, XP55020096.
U.S. Appl. No. 13/361,343, filed Jan. 30, 2012.
U.S. Appl. No. 13/246,076, filed Sep. 27, 2011.
U.S. Appl. No. 13/315,818, filed Dec. 9, 2011.
U.S. Appl. No. 13/410,209, filed Mar. 1, 2012.
Mobile Payments at the Physical Point-of-Sale: Assessing U.S. Market Drivers and Industry Direction, *Smart Card Alliance Report*, vol. PT-05001, pp. 1-52, Apr. 2005.
GlobalPlatform: Contactless Services, Card Specification v2.2 Version 1.0, pp. 1-77, Apr. 2010.
Boly, J. et al., The ESPIRIT Project CAFE—High Security Digital Payment Systems, *ESCORICS 94 (Third European Symposium on Research in Computer Security)*, pp. 217-230, 1994.
Chen, Z., How to Write a Java Card Applet: A Developer's Guide, JavaWorld.com, pp. 1-9, Jul. 1, 1999.
Corum, C., Editor, Santa Clara Puts Payments in 'Palm' of Your Hand: Palms and Cellphones Initiate Payments to Campus Card System, CR80News.com, vol. 2, pp. 1-5, May 2003.
Daswani, N et al., SWAPEROO: A Simple Wallet Architecture for Payments, Exhanges, Refunds and Other Operations, *Proceedings of the 3rd USENIX Workshop on Electronic Commerce*, pp. 1-20, Aug. 31, 1998.
Dotzer, F., Aspects of Multi-Application Smart Card Management Systems, *Thesis at the Lehrstuhl fur Dateoverarbeitung (LDV)*, pp. 1-124, Oct. 15, 2002.
Hernandez, R., E-Wallet Software Architecture and Decentralized Credentials, *Norsk Informatikkonferancse (NIK)*, pp. 1-12, 2003.
Hernandez, R., E-Wallet with Decentralized Credential Keepers, *Master Thesis*, pp. 1-74, Jun. 30, 2003.
Huang, P. et al., Future Personal 'E-Payment': IrFM, *IEEE Wireless Communications*, pp. 1-7, Feb. 2006.
Mjolsnes, S., On-Line E-Wallet System with Decentralized Credential Keepers, *Mobile Networks and Applications*, vol. 8, pp. 87-99, 2003.
Yun, S. et al., Design and Implementation of Wireless Payment Systems Using GVM and MobileC, *Proceedings of the International Conference on Mobile Computing and Ubiquitous Networking*, vol. 1, pp. 1-10, 2005.
ECMA-352 Near Field Communications Interface and Protocol-2 (NFCIP-2) (retrieved from www.ecma-international.org), *ECMA International Standard*, pp. 1-12, Jun. 1, 2010.
U.S. Appl. No. 13/443,683 to Hertel et al., filed Apr. 10, 2012.
Author: Bolton, H., Title: Australian Office Action issued in Application No. 2011336348, pp. 1-3, Dated: May 31, 2013.
Author: Chencinski, S., Title: Office Action issued in copending U.S. Appl. No. 13/361,343, filed Jan. 30, 2012, pp. 1-11, Dated: Jun. 7, 2013.
Author: Gillmore, A., Title: Australian Office Action issued in Application No. 2012308186, pp. 1-3 Date: Sep. 17, 2013.
Author: Kang, H. G., Title: International Search Report and Written Opinion issued in Application No. PCT/US2013/035861, pp. 1-12, Dated: Jun. 24, 2013.
Author: Shaawat, M., Title: Office Action issued in co-pending U.S. Appl. No. 13/315,818, filed Dec. 9, 2011, pp. 1-8, Dated: Jul. 30, 2013.

\* cited by examiner

DETECTING A COMMUNICATION TAP VIA SIGNAL MONITORING

TECHNICAL FIELD

The present disclosure relates generally to contactless devices and more particularly to methods and systems that allow for point of sale processing and communication initiated by a Bluetooth communication channel.

BACKGROUND

Near field communication ("NFC") is a proximity communication technology that can enable contactless device payment transactions with a point of sale system. NFC communication generally is conducted in a range from about 3 to about 4 inches. Such short communication distances enable secure communication between close field proximity enabled devices. In operation of an NFC transaction, a user "taps" a contactless device, such as an NFC-enabled mobile phone, to a reader of a point of sale system. The reader recognizes the NFC-enabled device when the device is moved within range of the reader, establishes a secure communication channel with the device, and initiates a payment transaction between the reader and the device. The duration of the NFC transaction is very short and does not easily permit communication of other information or the conduct of other services during the transaction. Additionally, the contactless device must be held close to the reader during the entire NFC transaction.

NFC contactless payment devices can function as a credit card to enable purchases at the point-of-sale by communicating credit card account information to the point of sale reader. However, the short duration of conventional NFC methods and systems for contactless payment devices does not enable the utilization of value-added services and user choices to a transaction. During the conventional transaction, the device and the reader communicate to complete the predefined transaction. Further user input or further transactions, such as user selection of coupons or loyalty rewards or automatic application of those items, is not possible in the predefined NFC transaction, without establishing another connection or holding the device close to the reader for the entire transaction. Alternative conventional methods require multiple taps or a tap and hold of the contactless device to enable the utilization of each service, resulting in user inconvenience. Additionally, few mobile devices, such as mobile phones, are equipped with NFC functionality. Without NFC functionality, such mobile devices cannot be used for NFC transactions. Many mobile devices are equipped with Bluetooth technology. Accordingly, it would be desirable to use Bluetooth technology on the context of NFC transactions

SUMMARY

In certain exemplary aspects, systems and methods of allowing point of sale processing and communication initiated by a Bluetooth communication channel comprises a point of sale ("POS") terminal reader that facilitates a Bluetooth communication connection with a contactless device. A contactless device and terminal reader establish an unsecure communication channel that can measure signal strength. The user taps the contactless device in the terminal reader's radio frequency field. The contactless device creates receive signal strength indicator ("RSSI") value spikes, which indicate the proximity of the contactless device to the reader based on the strength of the Bluetooth signal received from the reader. The terminal reader measure the RSSI values, calculates an average RSSI value and transmits them to the contactless device. The contactless device determines if the average value reaches or exceeds threshold value for the contactless device. In an alternative exemplary embodiment, the terminal reader compares the RSSI values to the threshold value for the contactless device, without transmitting the values to the device. If the threshold is reached, the terminal reader and the contactless device establish a secure communication connection. The device and the reader communicate via the secure communication connection and the connection is terminated when a request to terminate is received.

These and other aspects, objects, features, and advantages of the exemplary embodiments will become apparent to those having ordinary skill in the art upon consideration of the following detailed description of illustrated exemplary embodiments.

DETAILED DESCRIPTION OF EXEMPLARY EMBODIMENTS

Overview

The exemplary embodiments provide methods and systems that enable the detection of a communication tap via signal monitoring include a Bluetooth communication channel that allows communication with a POS reader from outside the reader's NFC field of communication. The contactless device and the terminal reader establish an unsecure communication channel that can measure signal strength, for example an insecure RFCOMM channel. Upon successful connection, the contactless device and terminal reader engage in a security protocol that occurs over the RFCOMM channel. Manual pairing and entry of a personal identification number ("PIN") is not required. The user simulates an NFC tapping motion by moving the contactless device toward the POS reader to place the device next to the reader. The tapping motion causes the contactless device to create RSSI value spikes. For example, the tapping motion of the contactless device creates measurable spikes of the power present in the radio signal received by the reader. The terminal reader measures the RSSI values, calculates an average RSSI value and transmits them to the contactless device. The transmitted values may comprise the average RSSI value. The average RSSI value is calculated by determining a total time period for measuring the RSSI value from the device, determining the number of intervals during this time period in which measurements will be taken from the device, and the period of time between each interval. The terminal reader then detects an initial RSSI value and subsequent RSSI values at the set intervals for the determined period of time and computes the average RSSI value.

RSSI is a measurement of the strength of the signal received from a device. The signal strength is lower if the contactless device is farther from the reader, and the signal strength increases as the contactless device is moved towards the reader. Accordingly, the RSSI can be monitored over time to detect when a user "taps" the contactless device to the reader, in a manner similar to "tapping" the contactless device to the reader for an NFC communication.

Once the average RSSI value is measured and transmitted to the contactless device, the contactless device determines whether the average value reaches or exceeds a minimum threshold value for the contactless device. If the threshold is reached, the terminal reader and the contactless device establish a communication connection. If the threshold is not reached, the reader continues to monitor for a tap. In an alternative exemplary embodiment, the terminal reader compares the RSSI values to the threshold value for the contactless device, without transmitting the values to the device.

To establish a new secure communication connection, the terminal reader communicates a request to the contactless device. The contactless device accepts the secure communication request. The devices communicate via the secure communication connection, and the connection is terminated when a request to terminate is received.

The functionality of the exemplary embodiments will be explained in more detail in the following description, read in conjunction with the figures illustrating the program flow.

System Architecture

Figure 1:
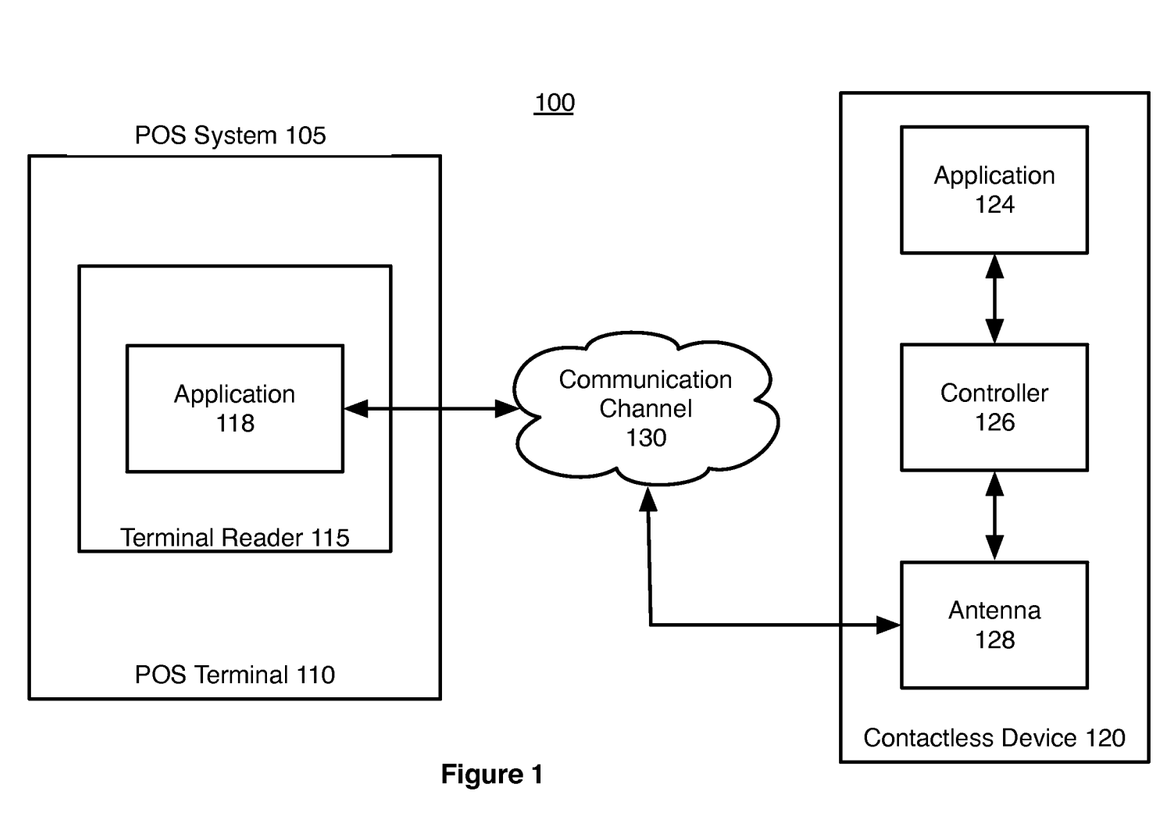
FIG. 1 is a block diagram depicting a system for detecting a communication tap of a contactless device with a point of sale ("POS") reader device using signal monitoring according to an exemplary embodiment.

FIG. 1 is a block diagram depicting a system 100 for detecting a communication tap of a contactless device 120 with a terminal reader 115 using signal monitoring according to an exemplary embodiment. As depicted in FIG. 1, the exemplary operating environment 100 includes a merchant POS system 105 and a contactless device 120 that are configured to communicate with one another via one or more communication channels 130.

The communication channel 130 includes a telecommunication means by which network devices (including devices 110 and 120) can exchange data. In exemplary embodiments, the communication channel 130 comprises a proximity communication connection, such as Bluetooth, NFC, or Wi-Fi. Bluetooth can enable the exchange of data over short distances through the creation of personal area networks with high levels of security. NFC and Wi-Fi also can enable data communication over short distances. The terms "data" and "information" are used interchangeably herein to refer to text, images, audio, video, or any other form of information that can exist in a computer-based environment.

The POS system 105 includes a terminal reader 115 that is capable of communicating with the contactless device 120 and the POS terminal 110 via an application 118. In an exemplary embodiment, the terminal reader 115 communicates with the contactless device 120 using a Bluetooth communication protocol. In alternative exemplary embodiments, the terminal reader 115 communicates with the contactless device 120 using an NFC or a Wi-Fi communication protocol.

As depicted in FIG. 1, the terminal reader 115 may be a component of the POS terminal 110. In an alternative exemplary embodiment, the terminal reader 115 may be a standalone device that communicates with the POS terminal 110 via one or more secure communication channels. As a standalone device, the terminal reader 115 may be communicatively coupled to the POS terminal 115.

In an exemplary embodiment, the contactless device 120 is a smart device that can communicate via an electronic, magnetic, or radio frequency field between the device and another device, such as the terminal reader 115. In an exemplary embodiment, the contactless device 120 has processing capabilities, such as storage capacity/memory (not depicted) and one or more application 124 that can perform a particular function. In an exemplary embodiment, the contactless device 120 comprises an operating system (not depicted) and user interface (not depicted). Exemplary contactless devices 120 include smart phones; mobile phones; personal digital assistants ("PDAs"); mobile computing devices, such as netbooks and iPads; other electronically enabled key fobs; electronically enabled credit card type cards; and other devices, in each case having processing and user interface functionality. Certain contactless devices 120 can be used for multiple purposes, including financial transactions, coupons, ticketing, secure authentication, and other related applications.

The controller 126 controls the overall operation of communication, including the processing and control of voice and data communications. In an exemplary embodiment, the controller 126 communicates with the application 124 in the contactless device 120. The controller 126 can interact with a secure key encrypted application 124 for decryption and installation of information in a secure element (not depicted). In an exemplary embodiment, the controller 126 is a Bluetooth link controller. The Bluetooth link controller can be capable of sending and receiving data, identifying the terminal reader 115, performing authentication and ciphering functions, and directing how the contactless device 120 will listen for transmissions from the device reader 115 or configure the contactless device 120 into various power-save modes according to the Bluetooth-specified procedures.

The application 124 is a program, function, routine, applet or similar entity that exists on and performs its operations on a contactless device 120. For example, the application 124 may be one or more of a digital wallet application, a coupon application, a loyalty card application, another value-added application, a user interface application, or other suitable application operating on the contactless device 120. Additionally, the secure element (not illustrated) also may comprise secure contactless software applications, such as payment applications, secure forms of the applications 124, authentication applications, payment provisioning applications, or other suitable application using the secure functionality of the secure element.

The contactless device 120 communicates with the terminal reader 115 via an antenna 128. In an exemplary embodiment, once the contactless device application 124 has been activated and prioritized, the controller 126 is notified of the state of readiness of the contactless device 120 for a transaction. The controller 126 outputs through the antenna 128 a radio signal, or listens for radio signals from the terminal reader 115. The method for detecting a communication tap via signal monitoring is described in more detail hereinafter with reference to the methods described in FIGS. 2-4.

System Process

Figure 2:
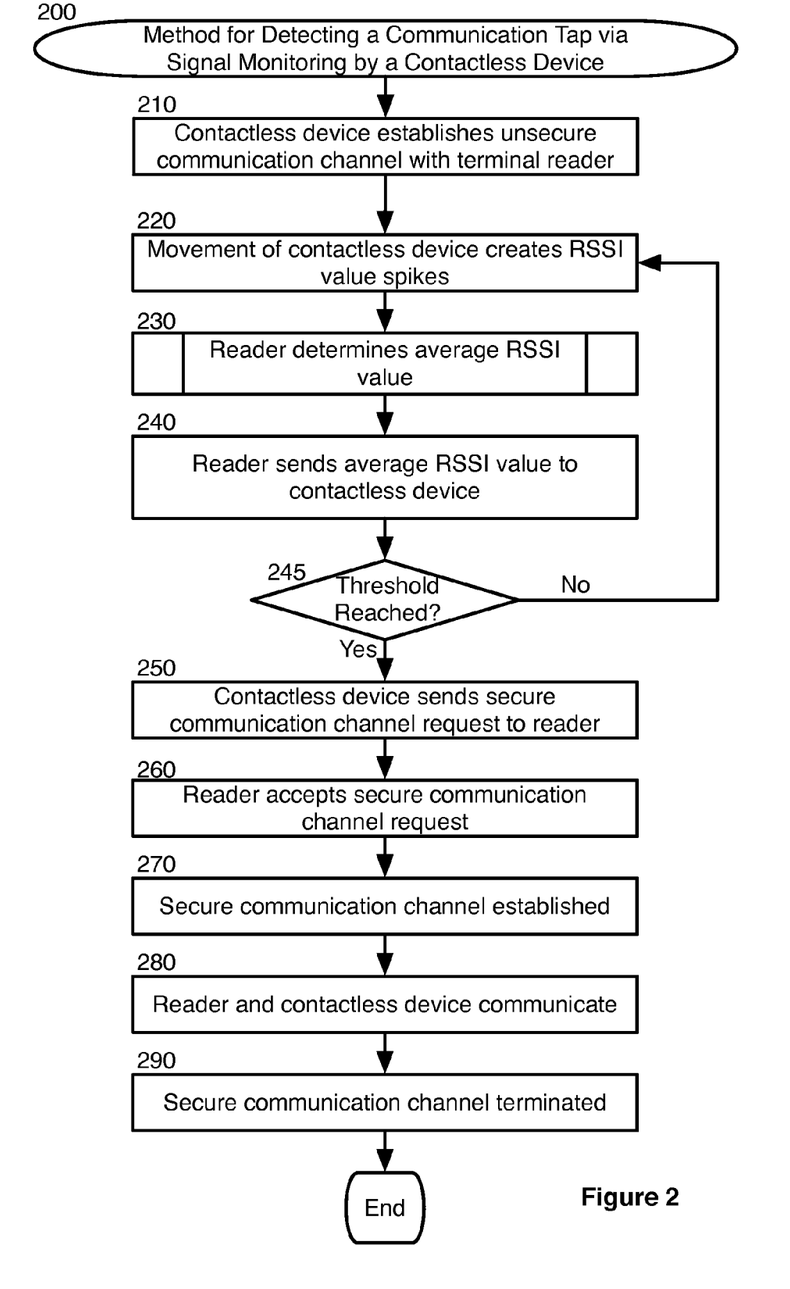
FIG. 2 is a block flow diagram depicting a method for detecting a communication tap of a contactless device with a POS reader device by the contactless device using signal monitoring according to an exemplary embodiment.

FIG. 2 is a block flow diagram depicting a method 200 for method for detecting a communication tap of a contactless device 120 with a terminal reader 115 by the contactless device 120 using signal monitoring according to an exemplary embodiment. The method 200 is described with reference to the components illustrated in FIG. 1.

In block 210, the contactless device 120 and the terminal reader 115 establish a communication channel 130. In an exemplary embodiment, the communication channel is an unsecure communication channel. In an exemplary embodiment, the devices establish an open connection as soon as the devices discover one another. For example, the devices may establish a Bluetooth communication channel wherein no personal identification number (PIN) is required and no manual pairing is required. In an exemplary embodiment, the unsecure communication channel is used to measure signal strength and to determine when a "tap" has occurred.

In an exemplary embodiment, the contactless device 120 enters a proximity (for example, 100 meters) to the terminal reader 115, wherein the contactless device 120 is close enough to discover and/or contact the terminal reader 115 over a Bluetooth channel. In an alternative exemplary embodiment, the terminal reader 115 may discover and/or contact the contactless device 120. In an exemplary embodiment, Bluetooth discovery occurs. For example service discovery protocol ("SDP") allows the devices 120 and 115 to discover which services each device supports and what parameters to use to connect to them. In an alternative exemplary embodiment, an external mechanism determines that the contactless device 120 is within communication range of the terminal reader 115. For example, the contactless device's built-in global positioning system ("GPS") may be used. The contactless device 120 will attempt to contact the terminal reader 115 by connecting to the reader's Bluetooth address and port using an insecure RFCOMM. An insecure RFCOMM is an ordinary Bluetooth socket that does not require Bluetooth device pairing to occur. Therefore, it is "insecure" because there is no identification of the endpoints other than a Bluetooth address. If the contactless device 120 is detected in the proximity of the terminal reader 115 using different means than SDP (for example, using GPS), it will require the terminal reader's 115 Bluetooth address. In an exemplary embodiment, the terminal reader's 115 Bluetooth address is provided via a cloud network backend that provides the location of the terminal reader 115 as well as its Bluetooth address in order to open an insecure RFCOMM channel. Upon successful connection to the terminal reader 115 by the contactless device 120, the devices 115 and 120 engage in a security protocol that occurs over the RFCOMM channel. In an exemplary embodiment, the terminal reader 115 has a secure sockets layer ("SSL") certificate and the contactless device 120 may open an SSL channel to the terminal reader 115 using the RFCOMM channel as a transportation layer. In an exemplary embodiment, the SSL channel is a secure communication channel.

In block 220, the movement of the contactless device 120 towards the terminal reader 115 creates receive signal strength indicator ("RSSI") value spikes. RSSI is an indication of the power level of a signal being received by the antenna of a device. A higher RSSI number (which may be a less negative number in some cases) indicates a stronger signal. For Bluetooth technologies, RSSI also is analogous to an indication of the distance between devices. A higher RSSI number indicates the devices are closer than a lower RSSI number.

In an exemplary embodiment, the movement of the contactless device 120 during a "tap" with the terminal reader 115 creates the RSSI value spikes. The close proximity of the contactless device 120 to the terminal reader 115 results in larger RSSI value spikes requiring smaller movement of the contactless device 120. In another exemplary embodiment, the contactless device 120 is further from the terminal reader 115, requiring larger and more frequent movements to create RSSI value spikes.

In an exemplary embodiment, it may be difficult to detect when a tap has occurred. For example, detection may require an accelerometer. In an exemplary embodiment, detection of the tap indicates to the contactless device that it is communicating with a particular POS system 105. In an alternative exemplary embodiment, detection of the tap indicates that the contactless device 120 is ready to start a payment session.

In an exemplary embodiment for NFC operations, the terminal reader 115 generates a radio frequency or other field continuously polling for the presence of a contactless device 120, and the user "taps" the contactless device by placing the device 120 within the field of the reader 115. In another exemplary embodiment for NFC operations, the contactless device 120 generates a radio frequency or other field continuously polling for the presence of a terminal reader 115, and the user "taps" the contactless device by placing the device 120 in close proximity of the reader 115.

For Bluetooth communication, the contactless device 120 and the POS reader 115 do not have to be in such close proximity (for example, 3 inches to 4 inches apart as with NFC) for communication. However, to provide the security of requiring that the contactless device 120 and the POS reader 115 are within such close proximity, the method 200 uses Bluetooth signal monitoring to identify when the user simulates an NFC tap by moving the contactless device 120 towards the POS reader 115 to place the contactless device 120 within the close proximity to the POS reader 115.

In an exemplary embodiment, once a communication channel 130 is established, the terminal reader 115 begins to take measurements of the RSSI value for that connection. These RSSI values indicate the perceived strength of the signal from the contactless device 120, as observed by the terminal reader 115.

In exemplary embodiments, RSSI can be measured by either the contactless device 120, the POS reader 115, or both. The contactless device 120 measure the RSSI for the signals received from the POS reader 115. The POS reader 115 measures the RSSI for the signals received from the contactless device 120.

In an exemplary embodiment, the contactless device 120 opens a Bluetooth connection. The signal strength of the contactless device 120 is measured by the POS system 105 using periodic sampling. The POS system 105 indicates to the contactless device 120 that it is measuring the signal strength by sending measurements. For example, the POS system 105 may send a single measurement, multiple measurements, or an average of the measurements. The contactless device 120 determines when a tap has occurred based on the signal strength measurements received from the POS system 105 by determining when the signal strength has spiked.

In an alternative exemplary embodiment, an accelerometer is utilized by the POS system 105. Because the POS system 105 can trick the contactless device 120 into thinking a spike has occurred based on the signal strength measurements sent, measurements may be made by either the contactless device 120 or the POS system 105. The accelerometer is built into the POS system 105 so the contactless device can read the signal strength of the POS system. The contactless device 120 may send signal strength measurements to the POS system 105 for determination whether a spike has occurred by the POS system 105 or the contactless device 120 may make the determination of when a signal spike has occurred.

In block 230, the terminal reader 115 and/or the contactless device 120 determines an average RSSI value. In an alternative exemplary embodiment, a single RSSI value measurement is sufficient, without determining an average RSSI value. The method 230 for determining the average RSSI value is described in more detail hereinafter with reference to the methods described with reference to FIG. 3. While blocks 310-360 are generally described with reference to the terminal reader 115 monitoring RSSI based on signals received from the contactless device 120, the blocks can be performed by the contactless device 120 monitoring RSSI based on signals received from the terminal reader 115.

Figure 3:
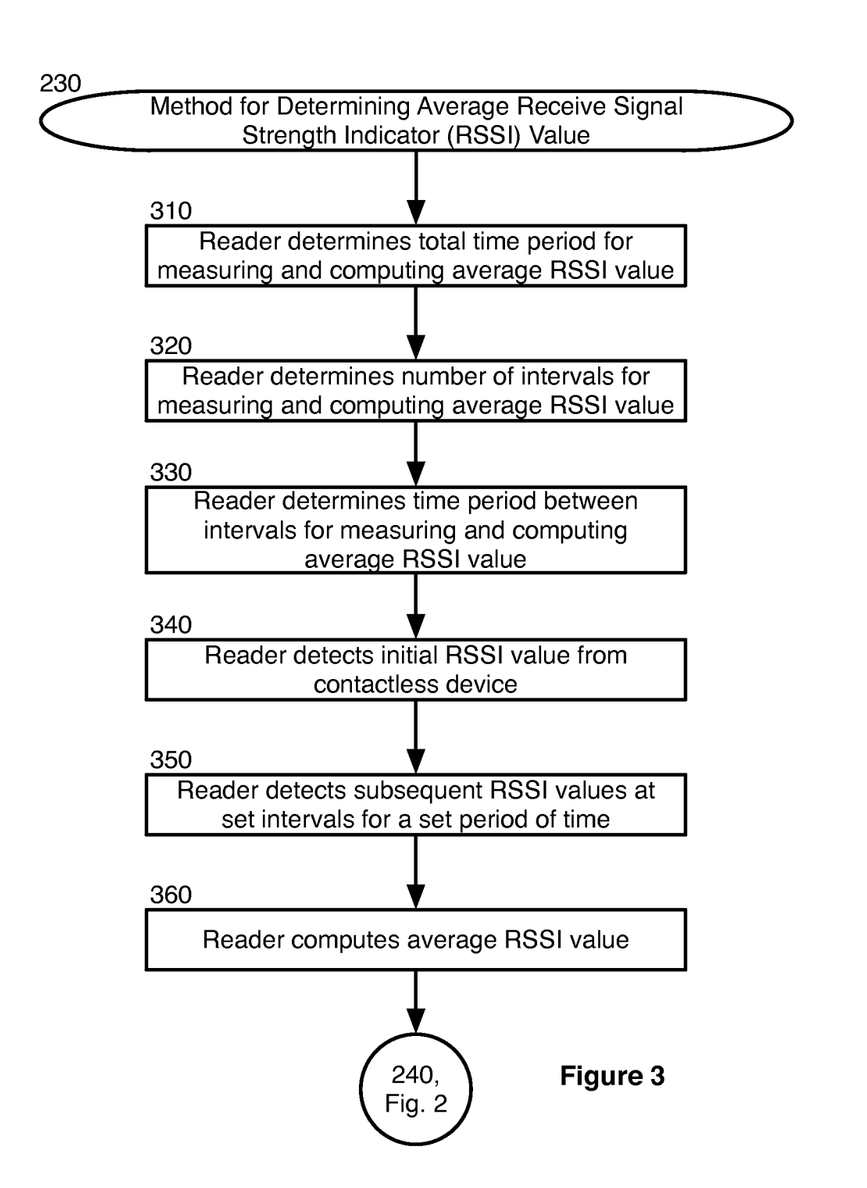
FIG. 3 is a block flow diagram depicting a method for determining the average receive signal strength indicator ("RSSI") value according to an exemplary embodiment.

FIG. 3 is a block flow diagram depicting a method 230 for determining the average RSSI value according to an exemplary embodiment. The method 230 is described with reference to the components illustrated in FIG. 1.

In an exemplary embodiment, while the user taps the contactless device 120 in the proximity of the terminal reader 115, the reader 115 determines the average RSSI value. In another exemplary embodiment, the contactless device 120 determines the average RSSI value.

In block 310, the terminal reader 115 determines a total time period during which the terminal reader 115 will measure RSSI values and determining the average RSSI value. In an alternative exemplary embodiment, the contactless device 120 determines the total time period to be utilized in measuring RSSI values and determining the average RSSI value.

In an exemplary embodiment, the total time period can be 100 milliseconds, which can simulate a time period of a near field communication tap. The time period can be configured to measure a suitable interval such that an average RSSI value during the time period indicates a "tapping" motion of the contactless device 120 with the terminal reader 115.

In block 320, the terminal reader 115 determines the number of intervals in which RSSI measurements will be taken to determine the average RSSI value. In an alternative exemplary embodiment, the contactless device 120 determines the number of intervals in which RSSI measurements will be taken to determine the average RSSI value.

In block 330, the terminal reader 115 determines the time period between intervals in which RSSI measurements will be taken to determine the average RSSI value. In an alternative exemplary embodiment, the contactless device 120 determines the time period between intervals in which RSSI measurements will be taken to determine the average RSSI value. In an exemplary embodiment, the intervals are continuous (for example, every millisecond).

The terminal reader 115 detects the initial RSSI value of the contactless device 120 in block 340. In an alternative exemplary embodiment, the contactless device 120 detects the initial RSSI value.

In block 350, the terminal reader 115 detects subsequent RSSI values at set intervals for a set period of time as determined in blocks 310, 320 and 330. In an alternative exemplary embodiment, the contactless device 120 detects subsequent RSSI values at set intervals for a set period of time as determined in blocks 310, 320 and 330.

The terminal reader 115 computes the average RSSI value over the set time period in block 360. In an alternative exemplary embodiment, the contactless device 120 computes the average RSSI value over the set time period.

From block 360, the method 230 proceeds to block 240 (FIG. 2).

Returning to FIG. 2, in block 240, the terminal reader 115 transmits an average RSSI value to the contactless device 120. In an exemplary embodiment, a moving average of the RSSI values is transmitted from the terminal reader 110 to the contactless device 120 several times per second. In an alternative exemplary embodiment, a single RSSI value is transmitted from by the terminal reader 115 to the contactless device 120 and the methods described in blocks 310-360 of FIG. 3 are omitted.

In block 245, the contactless device 120 determines if the threshold RSSI value was reached. In an exemplary embodiment, an acceptable RSSI value range is pre-determined for the contactless device 120. In an alternative exemplary embodiment, the pre-determined acceptable value is communicated to the terminal reader 115 by the contactless device 120 and the terminal reader 115 determines if the threshold average RSSI value was reached.

If the threshold average RSSI value was not reached in block 245, the method 200 returns to block 220 in which the user "taps" the contactless device 120 in the proximity of the terminal reader 115 to create RSSI value spikes.

If the average RSSI value meets or exceeds the configured threshold average RSSI value, the method 200 proceeds to block 250 in which the contactless device 120 sends a secure communication request to the terminal reader 115. In an exemplary embodiment, the communication request includes the average RSSI value. In an alternative exemplary embodiment, the terminal reader 115 sends a communication request to the contactless device 120. In an exemplary embodiment, the communication request is for a secure communication channel 130. In an exemplary embodiment, the secure communication channel 130 is an RF communications channel, such as Bluetooth.

In an exemplary embodiment, the communication request is an indication that the average RSSI value met or exceed the threshold value.

In block 260, the terminal reader 115 accepts the secure communication request.

In block 270, the terminal reader 115 and the contactless device 120 establish a new secure communication channel 130. The secure communication channel 130 can be established in exemplary embodiments via Bluetooth. Such secure communications can provide benefits over an NFC-type connection. For example, such secure communications can remain open for ranges farther than the limited 3-4 inch range of NFC communications. Additionally, such secure communications can remain open for longer time periods, for example, until terminated by the terminal reader 115, the contactless device 120, or by user input into the device 120.

In block 280, the terminal reader 115 and the contactless device 120 communicate via the secure communications channel 130. In exemplary embodiments, the secure communications can include conducting a secure payment transaction; applying coupons, loyalty rewards, or other offers to a transaction; incrementing loyalty rewards for the transaction; downloading applications or other information; or any other suitable communication.

Although described throughout this specification as the terminal reader 115 performing specific functions, such functions may be performed by the application 118 and/or the POS terminal 110 and communicated to the contactless device 120 via the terminal reader 115.

In block 280, the secure communications channel 130 can be terminated when the request to terminate a secure communication channel between the terminal reader 115 and the contactless device 120 is communicated, or any suitable time thereafter.

From block 280, the method 200 ends.

Figure 4:
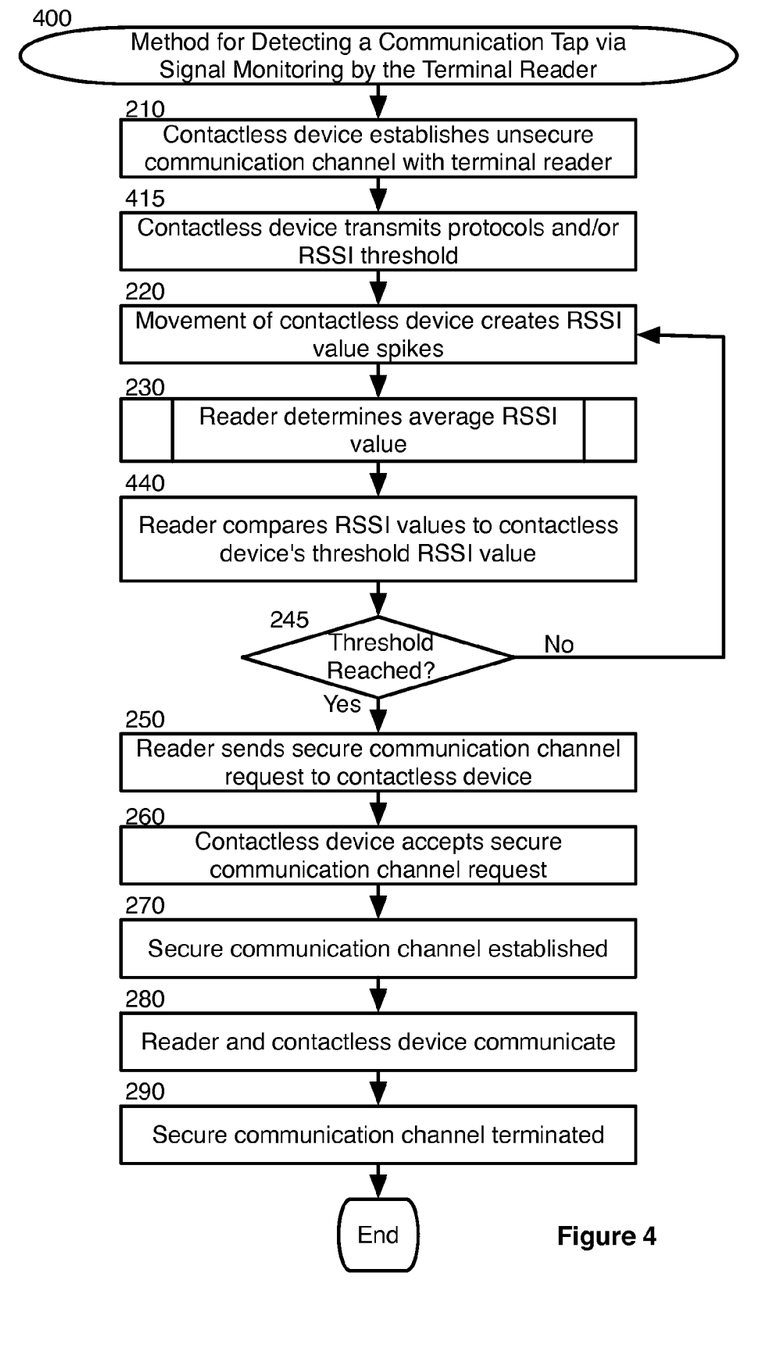
FIG. 4 is a block flow diagram depicting a method for detecting a communication tap of a contactless device with a POS reader device by the POS reader device according to an exemplary embodiment.

FIG. 4 is a block flow diagram depicting a method 400 for detecting a communication tap of a contactless device 120 with a terminal reader 115 by the terminal reader 115 according to an exemplary embodiment. The method 200 is described with reference to the components illustrated in FIG. 1.

In block 210, the contactless device 120 and the terminal reader 115 establish a communication channel 130. In an exemplary embodiment, block 210 of FIG. 4 can be performed in a manner described previously with reference to block 210 of FIG. 2.

In block 415, the contactless device 120 transmits characteristic and protocols to the terminal reader. In an exemplary embodiment, the characteristic and protocols comprise a RSSI threshold value that is pre-determined for the contactless device 120.

In an exemplary embodiment, blocks 220 through 230 of FIG. 4 can be performed in a manner described previously with reference to blocks 220 through 430 of FIG. 2.

In block 440, the terminal reader 115 compares the RSSI values to the RSSI threshold value transmitted by the contactless device 120 in block 405. In an exemplary embodiment, the terminal reader 115 compares the average RSSI value calculated in block 230 to the threshold RSSI value for the contactless device 120. In an alternative exemplary embodiment, the terminal reader 115 compares a singe measured RSSI value to the RSSI threshold value for the contactless device 120. In this embodiment, the method described in block 230 of FIG. 4 may be omitted.

In an exemplary embodiment, blocks 245 through 290 of FIG. 4 can be performed in a manner described previously with reference to blocks 245 through 290 of FIG. 2, except the terminal reader 115 sends a secure communication request to the contactless device 120 and the contactless device 120 accepts the request. In an exemplary embodiment, the request for a secure communication channel 130 comprises the measured or average RSSI value. In an alternative exemplary embodiment, the request for a secure communication channel 130 also comprises the threshold RSSI value for the contactless device 120 received in block 415.

From block 290, the method 400 ends.

General

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed, including for situations in which users may have concerns regarding privacy. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as the act may be performed by more than one computer.

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for detecting a tap of a mobile communication device with a point of sale system, comprising:

establishing a first communication channel by a point of sale ("POS") device with a mobile communication device;

detecting, by the POS device, receive signal strength indicator ("RSSI") value spikes based on the strength of a signal from the mobile communication device, as observed by the POS device when the mobile communication device is moved in proximity to the POS device;

transmitting, by the POS device, an RSSI value monitored during a predetermined period of time to the mobile communication device;

receiving, by the POS device, a request to establish a second communication channel with the mobile communication device in response to a determination that the RSSI value monitored during the predetermined period of time meets or exceeds a threshold value established for the mobile communication device;

communicating, by the POS device, an authorization to establish the second communication channel with the mobile communication device; and communicating, by the POS device, information to and receiving, by the POS device, information from the mobile communication device via the second communication channel.

2. The method of claim 1, wherein the first communication channel is a Bluetooth communication channel.

3. The method of claim 1, wherein the first communication channel is an unsecure communication channel.

4. The method of claim 1, wherein the first communication channel is a radio frequency (RF) communication channel.

5. The method of claim 1, wherein the second communication channel is a secure communication channel.

6. The method of claim 1, wherein the strength of the signal from the mobile communication device is measured by the POS device using periodic sampling.

7. The method of claim 1, wherein the POS device comprises a POS reader.

8. The method of claim 1, wherein the RSSI value transmitted to the mobile communication device is an average RSSI value.

9. A computer program product, comprising:
a non-transitory computer-readable medium having computer-readable program code embodied thereon for detecting a tap of a mobile communication device with a point of sale system, the computer-readable medium comprising:
computer-readable program code for establishing a first communication channel, by a point of sale (POS) device, with a mobile communication device;
computer-readable program code for detecting, by the POS device, receive signal strength indicator ("RSSI") value spikes based on the strength of a signal from the mobile communication device, as observed by the POS device, when the mobile communication device is moved in proximity to the POS device;
computer-readable program code for transmitting, by the POS device, an RSSI value monitored during a predetermined period of time to the mobile communication device;
computer-readable program code for receiving, by the POS device, a request to establish a second communication channel with the mobile communication device in response to a determination that the RSSI value monitored during the predetermined period of time meets or exceeds a threshold value established for the mobile communication device;
computer-readable program code for communicating, by the POS device, an authorization to establish the second communication channel with the mobile communication device; and
computer-readable program code for communicating, by the POS device, information to and receiving, by the POS device, information from the mobile communication device via the second communication channel.

10. The computer program product of claim 9, wherein the request to establish a second communication channel comprises an average RSSI value, and wherein the authorization indicates a confirmation that the average RSSI value meets or exceeds a threshold value established for the mobile communication device.

11. The computer program product of claim 9, wherein the first communication channel is a Bluetooth communication channel.

12. The computer program product of claim 9, wherein the first communication channel is an unsecure communication channel.

13. The computer program product of claim 9, wherein the second communication channel is a secure communication channel.

14. A system for detecting a tap of a mobile communication device with a point of sale system, comprising:
a computer configured to:
establish a first communication channel with a mobile communication device;
detect receive signal strength indicator ("RSSI") value spikes based on the strength of a signal from the mobile communication device when the mobile communication device is moved in proximity to a POS device; and
transmit an RSSI value of the mobile communication device monitored during a predetermined period of time to the mobile communication device;
receive a request to establish a second communication channel with the mobile communication device in response to a determination that the RSSI value monitored during the predetermined period of time meets or exceeds a threshold value established for the mobile communication device;
communicate an authorization to establish the second communication channel with the mobile communication device; and
communicate information to, and receive information from, the mobile communication device via the second communication channel; and
an application module configured to execute on a mobile communication device to transmit a request to establish a second communication channel.

15. The system of claim 14, wherein the computer comprises point of sale system.

16. The system of claim 14, wherein the computer comprises point of sale system reader.

17. The system of claim 14, wherein the RSSI value comprises the average RSSI value, wherein the application module is further configured to verify that the average RSSI value meets or exceeds the threshold value established for the mobile communication device, and wherein the request comprises a confirmation that the average RSSI value meets or exceeds the threshold value established for the mobile communication device.

18. A computer-implemented method for detecting a tap of a mobile communication device with a point of sale system, comprising:
establishing a first communication channel by a point of sale ("POS") device with a mobile communication device;
receiving, by the POS device, a threshold receive signal strength indicator ("RSSI") value from the mobile communication device;
detecting, by the POS device, RSSI value spikes based on the strength of a signal from the mobile communication device, as observed by the pas device when the mobile communication device is moved in proximity to the pas device;
determining, by the POS device, that the RSSI value monitored during a predetermined period of time meets or exceeds the threshold RSSI value for the mobile communication device; and
transmitting, by the POS device, a request to establish a second communication channel with the mobile communication device in response to a determination that the RSSI value monitored during the predetermined period of time meets or exceeds a threshold value established for the mobile communication device.

19. The method of claim 18, further comprising:
receiving, by the POS device, an authorization to establish the second communication channel with the mobile communication device; and
communicating, by the POS device, information to and receiving, by the pas device, information from the mobile communication device via the second communication channel.

20. The method of claim 18, wherein the first communication channel is a Bluetooth communication channel.

21. The method of claim 18, wherein the first communication channel is an unsecure communication channel.

22. The method of claim 18, wherein the first communication channel is a radio frequency (RF) communication channel.

23. The method of claim 18, wherein the second communication channel is an secure communication channel.

24. The method of claim 18, wherein the strength of the signal from the mobile communication device is measured by the POS device using periodic sampling.

25. The method of claim 18, wherein the POS device comprises a POS reader.

\* \* \* \* \*